E. LINDNER.

Cartridge.

No. 1,411.

Reissued Feb. 17, 1863

Witnesses,

Samuel W. Sewell

Chas. H. Smith

Edward Lindner

UNITED STATES PATENT OFFICE.

EDWARD LINDNER, OF NEW YORK, N. Y.

IMPROVEMENT IN CARTRIDGES FOR SMALL-ARMS.

*Specification forming part of Letters Patent No.* 32,949, *dated July* 30, 1861; *reissue No.* 1,411, *dated February* 17, 1863.

DIVISION 2.

*To all whom it may concern:*

Be it known that I, EDWARD LINDNER, of the city and State of New York, have invented, made, and applied to use, a certain new and useful Improvement in Projectiles; and I do hereby declare the following to be a full, clear, and exact description of my said invention, reference being had to the annexed drawing, making part of this specification, wherein—

Figure 1:
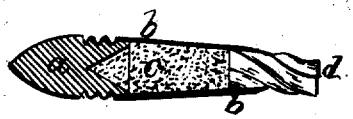
Figure 2:
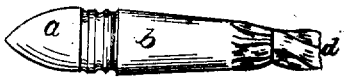

Figure 1 is a section of my said projectile, and Fig. 2 is an elevation of the same.

Similar marks of reference denote the same parts.

The nature of my said invention consists in a stopper of fibrous or other soft material, around which the paper case containing the powder is twisted, and which stopper may be drawn out by the teeth in loading, so that the powder does not become wet in "tearing cartridge;" neither does the powder come in contact with the mouth of the soldier. These two important requisites are attained by the simple introduction of said soft stopper, and in practice the said stopper is found to be greatly beneficial for the aforesaid reason, and also because no powder is lost by careless tearing nor in pouring the powder into the barrel, because the end of the case is left even and of a smaller size than the bore of the gun. For this reason the range of the piece is much more accurate than is the case where more or less powder may be lost in loading.

In the drawing, *a* is the ball, of any desired size or shape. *b* is the case, of paper or other suitable material, containing the powder *c*. *d* is my stopper, introduced at the back end of the case, which stopper I prefer to be of soft, fibrous material, such as cotton yarn, or roving, cut in short sections. The end of the case *b* should be compressed or twisted around this stopper, in order to hold it in sufficiently to prevent its falling out in handling; but when said stopper is seized by the teeth it can be withdrawn, and the case is left in a condition adapted to pouring all the powder into the gun, as the case itself is not torn or injured. The powder cannot become wet from the mouth or wasted except by carelessness; neither does the powder get into the mouth to add to the excessive thirst usual with soldiers in battle.

What I claim, and desire to secure by Letters Patent, is—

The stopper *d*, introduced into the back end of the cartridge-case, substantially as and for the purposes specified.

In witness whereof I have hereunto set my signature this 26th day of January, 1863.

Witnesses: EDWARD LINDNER.

LEMUEL W. SERRELL,

CHAS. H. SMITH.